(12) United States Patent
Fechner et al.

(10) Patent No.: US 11,007,936 B2
(45) Date of Patent: May 18, 2021

(54) CAMERA SYSTEM FOR A VEHICLE

(71) Applicant: Conti Temic microelectronic GmbH, Nuremberg (DE)

(72) Inventors: Thomas Fechner, Wasserburg (DE); Karsten Breuer, Oberreute (DE); Dieter Kroekel, Eriskirch (DE)

(73) Assignee: Conti Temic microelectronic GmbH, Nuremberg (DE)

(*) Notice: Subject to any disclaimer, the term of this patent is extended or adjusted under 35 U.S.C. 154(b) by 0 days.

(21) Appl. No.: 16/334,614

(22) PCT Filed: Dec. 11, 2017

(86) PCT No.: PCT/DE2017/200133
§ 371 (c)(1),
(2) Date: Mar. 19, 2019

(87) PCT Pub. No.: WO2018/145680
PCT Pub. Date: Aug. 16, 2018

(65) Prior Publication Data
US 2020/0139887 A1 May 7, 2020

(30) Foreign Application Priority Data
Feb. 10, 2017 (DE) .................... 10 2017 202 155.1

(51) Int. Cl.
*B60R 1/00* (2006.01)
*H04N 7/18* (2006.01)
*B60R 11/00* (2006.01)

(52) U.S. Cl.
CPC ............... *B60R 1/00* (2013.01); *H04N 7/181* (2013.01); *B60R 2011/0026* (2013.01); *B60R 2300/105* (2013.01); *B60R 2300/307* (2013.01)

(58) Field of Classification Search
CPC ............... B60R 1/00; B60R 2011/0026; B60R 2300/105; B60R 2300/307; H04N 7/181
See application file for complete search history.

(56) References Cited

U.S. PATENT DOCUMENTS

| | | | | |
|---|---|---|---|---|
| 2002/0167589 A1* | 11/2002 | Schofield | ............... | B60N 2/002 348/148 |
| 2002/0181743 A1* | 12/2002 | Khairallah | ........ | B60R 21/01538 382/104 |

(Continued)

FOREIGN PATENT DOCUMENTS

DE 102016013522 5/2017

OTHER PUBLICATIONS

PCT, English translation of the International Search Report of the International Searching Authority for International Application PCT/DE2017/200133, dated Mar. 22, 2018, 3 pages, European Patent Office, HV Rijswijk, Netherlands.

(Continued)

*Primary Examiner* — Tracy Y. Li
(74) *Attorney, Agent, or Firm* — W. F. Fasse

(57) ABSTRACT

A camera system for a vehicle includes a camera and an image evaluating unit. The camera is arranged in an interior of the vehicle behind a windowpane of the vehicle so that the camera can record an image sequence with a plurality of external recordings of external surroundings of the vehicle through the windowpane. The image evaluating unit is adapted to detect static image components that are projected into the external recordings by reflections on the windowpane, and to extract the detected static image components from the external recordings.

20 Claims, 2 Drawing Sheets

(56) References Cited

U.S. PATENT DOCUMENTS

| | | | | |
|---|---|---|---|---|
| 2007/0159317 | A1* | 7/2007 | Nagata | B60R 1/00 340/461 |
| 2013/0329045 | A1* | 12/2013 | Choi | H04N 5/2254 348/148 |
| 2015/0116462 | A1* | 4/2015 | Makabe | H04N 13/204 348/47 |
| 2017/0154241 | A1* | 6/2017 | Shambik | B60R 1/00 |

OTHER PUBLICATIONS

PCT, PCT International Preliminary Report on Patentability including English Translation of PCT Written Opinion of the International Searching Authority for International Application PCT/DE2017/200133, dated Aug. 13, 2019, 6 pages, International Bureau of WIPO, Geneva, Switzerland.

German, German Search Report for German Patent Application No. 10 2017 202 155.1, dated Jun. 12, 2017, 8 pages, German Patent and Trademark Office, Muenchen, Germany, with partial English translation, 6 pages.

Christian Simon et al., "Reflection Removal for In-Vehicle Black Box Videos", IEEE Conference on Computer Vision and Pattern Recognition (CVPR), Jun. 7, 2015, XP032793877, pp. 4231 to 4239.

Mohamed Abdelaziz Ahmed et al., "Reflection Detection in Image Sequences", IEEE Conference on Computer Vision and Pattern Recognition (CVPR), Jun. 20, 2011, XP032038172, ISBN: 978-1-4577-0394-2, 8 pages.

Naejin Kong et al., "A Physically-Based Approach to Reflection Separation: from Physical Modeling to Constrained Optimization", IEEE Transactions on Pattern Analysis and Machine Intelligence, IEEE Computer Society, USA, vol. 36, No. 2, Feb. 1, 2014, XP011534226, ISSN: 0162-8828, 14 pages.

* cited by examiner

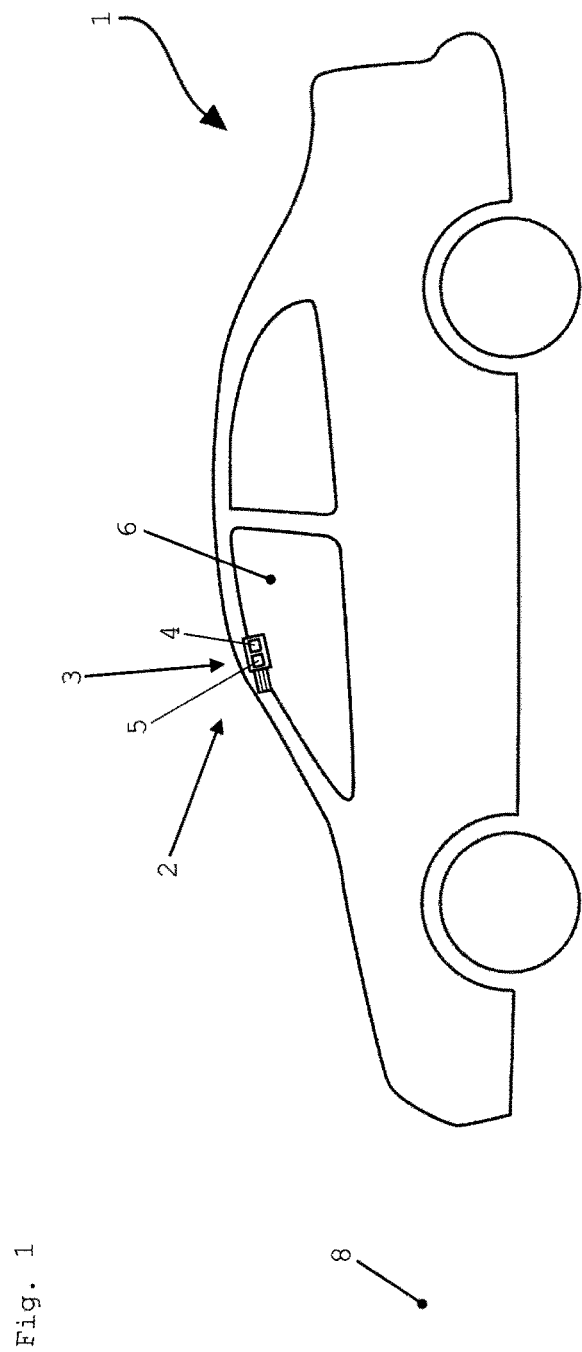
Fig. 1
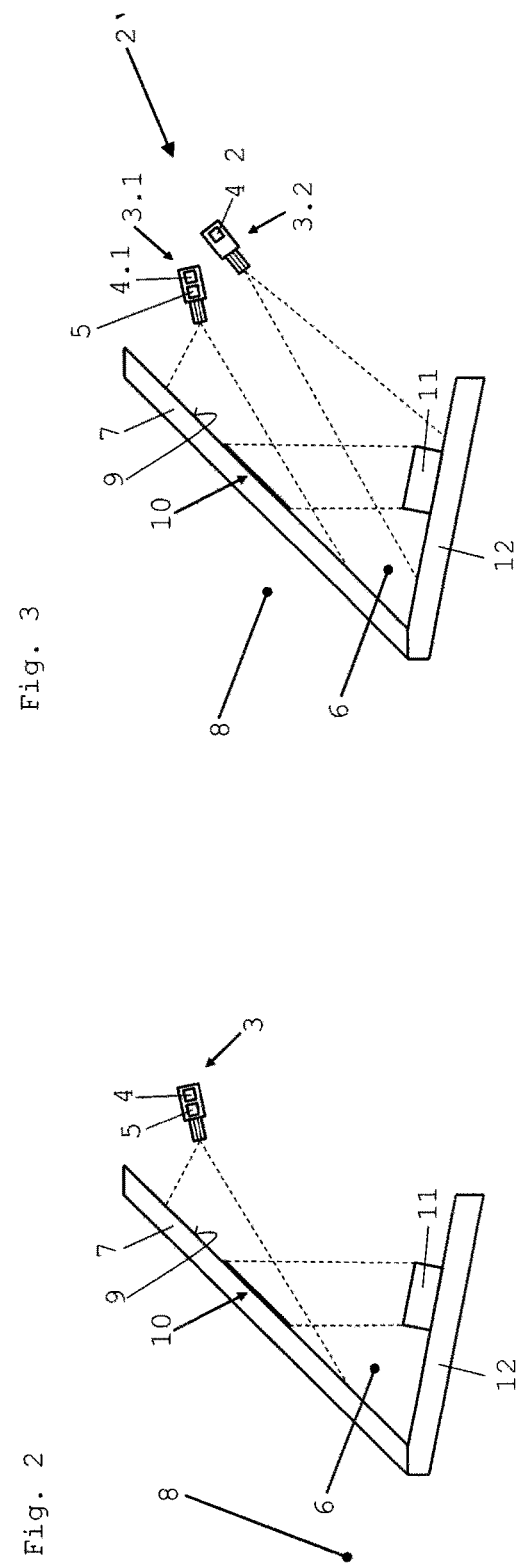
Fig. 3
Fig. 2

CAMERA SYSTEM FOR A VEHICLE

FIELD OF THE INVENTION

The invention relates to a camera system for a vehicle and to a method for suppressing a mirror image.

BACKGROUND INFORMATION

Camera systems for vehicles are known. In particular, camera systems in which a front-facing camera is used for detecting diverse objects in external surroundings of the vehicle are known. The camera is usually arranged behind a windshield of the vehicle and looks through the latter in driving direction. In so doing, interfering reflections can occur on the inside of the windshield, e.g., due to objects on a dashboard in a vehicle interior.

Polarizing filters can be used to suppress these reflections on the windshield. Further, lens hoods or funnels which occlude the space between the front-facing camera and the windshield can be used. At wider camera aperture angles, lens hoods of this type can be so large that the lens hoods impair the vision of the driver of the vehicle. Further, when struck by sunlight, lens hoods can generate an unwanted background signal which ultimately cancels out the useful signal and obscures structures to be detected. Due to the nonlinear characteristic of the high-dynamic imager, this results in a disproportionate reduction in contrast of the structures to be detected.

SUMMARY OF THE INVENTION

It is the object of the present invention to provide a camera system and a method of the type mentioned above which enable an effective suppression of windowpane reflections, wherein visual field of the driver of the vehicle is less impaired.

This object is achieved through the subject matter of the independent patent claims. Advantageous embodiment forms are the subject matter of the dependent claims, the following description and the figures.

According to a first aspect of the invention, a camera system for a vehicle is provided. For example, the vehicle is a motor vehicle such as a car, bus or truck. The camera system comprises a camera and an image evaluating unit. The camera is adapted to be arranged in an interior of the vehicle behind a windowpane of the vehicle so that the camera can record an image sequence with a plurality of external recordings of external surroundings of the vehicle through the windowpane. The image evaluating unit is adapted to detect static image components in the external recordings of the image sequence which are projected into the external recordings by reflections and to extract the detected static image components from the external recordings of the image sequence.

The invention makes use of the fact that unwanted interfering mirror images are largely static, whereas the wanted, useful image shows a moving scene while the vehicle is driving. The extraction of the static image components can be implemented by methods of image processing and allows a subtractive removal of the interfering image. The use of a lens hood can be dispensed with in some cases, but a lens hood can at least have particularly small dimensions because interfering image components have already been eliminated in a particularly effective manner by the extraction.

The detection of static image components in the external recordings of the image sequence can be carried out by various methods of image processing. In this context, particularly suitable methods of image processing will be described in the following.

According to one embodiment, the image evaluating unit can be adapted to detect the static image components in the external recordings of the image sequence through a time averaging of the external recordings of the image sequence. In so doing, variable image components are erased, while the static image components are retained.

Further, the image evaluating unit can be adapted to detect the static image components in the external recordings of the image sequence by determining an optical flow within the external recordings of the image sequence.

According to a further embodiment, the image evaluating unit is adapted to detect the static image components in the external recordings of the image sequence based on previously known structures (e.g., reflections of a dashboard arranged inside of the interior of the vehicle or reflections of objects located on the dashboard), wherein the previously known structures are stored in an image file which can be accessed by the camera. For example, the image file can be stored in a storage unit inside the camera. Alternatively, the image file can also be stored in an external storage unit which can be accessed by the camera.

According to a second aspect of the invention, the above-mentioned problem upon which the invention is based can be alternatively solved by a camera system for a vehicle, which camera system comprises a first camera, an image evaluating unit, a second camera and a processor unit. The first camera is adapted to be arranged in an interior of the vehicle behind a windowpane of the vehicle so that the first camera can record an image sequence with a plurality of external recordings of external surroundings of the vehicle through the windowpane. The second camera is adapted to be arranged in the interior of the vehicle so that the second camera can record an image sequence with a plurality of internal recordings of a dashboard arranged in the interior of the vehicle.

Further, the processor unit is adapted to match the internal recordings to the external recordings, and the image evaluating unit is adapted to extract from the external recordings image components in the external recordings which occur on the windowpane by reflection of the dashboard or of objects located on the dashboard. The image evaluating unit and the processor unit can also be coextensive with one another, i.e., can be an individual unit which can carry out the above-mentioned functions.

According to a third aspect of the invention, a method for suppressing a mirror image is provided, wherein a camera is arranged behind a windowpane of a vehicle in the interior of the vehicle and records an image sequence with a plurality of external recordings of external surroundings of the vehicle through the windowpane. The method comprises a detection of static image components in the external recordings of the image sequence by means of an image evaluating unit of the camera, which static image components are projected into the external recordings by reflections, and an extraction of the detected static image components from the external recordings of the image sequence by means of the image evaluating unit.

According to one embodiment, the detection of the static image components in the external recordings of the image sequence is carried out by means of time averaging of the external recordings of the image sequence by means of the image evaluating unit.

Further, the detection of the static image components in the external recordings of the image sequence can be carried out by determining an optical flow within the external recordings of the image sequence by means of the image evaluating unit.

According to a further embodiment, the detection of the static image components in the external recordings of the image sequence is carried out based on previously known structures by means of the image evaluating unit, wherein the previously known structures are stored in an image file which can be accessed by the camera. In particular, the previously known structures can be determined by machine learning processes.

According to a fourth aspect of the invention, an alternative method for suppressing a mirror image is provided. In this case, a first camera which is arranged behind a windowpane of a vehicle in an interior of the vehicle records an image sequence with a plurality of external recordings of external surroundings of the vehicle through the windowpane. Further, a second camera which is arranged in the interior of the vehicle records an image sequence with a plurality of internal recordings of a dashboard arranged in the interior of the vehicle. The method comprises matching the internal recordings to the external recordings by means of a processor unit and extracting image components in the external recordings from the external recordings by means of an image evaluating unit, which image components occur on the windowpane by reflection of the dashboard or of objects located on the dashboard.

BRIEF DESCRIPTION OF THE DRAWINGS

Embodiment examples of the invention will be described more fully in the following referring to the schematic drawings. The drawings show:

FIG. 1 a side view of a vehicle with an embodiment example of a camera system according to the invention;

FIG. 2 a more detailed side view of the camera system according to FIG. 1;

FIG. 3 a side view of a further embodiment example of an inventive camera system for the vehicle according to FIG. 1;

DETAILED DESCRIPTION OF EXAMPLE EMBODIMENTS OF THE INVENTION

Figure 5:
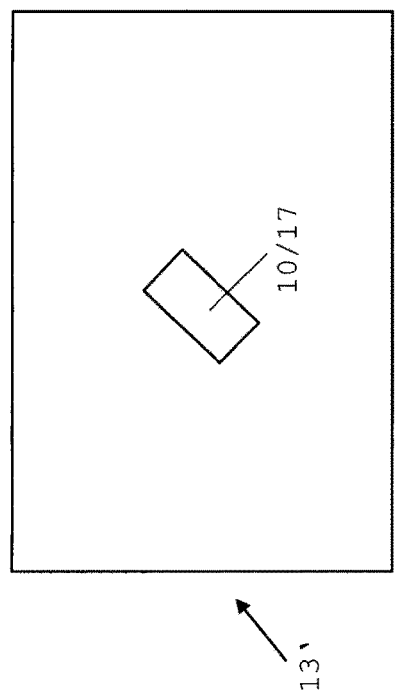
FIG. 5 the recording according to FIG. 4, in which only static image components of the recording according to FIG. 4 are shown.

FIG. 1 shows a vehicle 1 which is a car in the depicted embodiment example. The vehicle 1 comprises a camera system 2 which in turn has a camera 3 and an image evaluating unit 4. Further, as is shown by FIG. 1, the camera system 2 can comprise a processor unit 5. The image evaluating unit 4 and the processor unit 5 can also be combined in a common unit.

Figure 7:
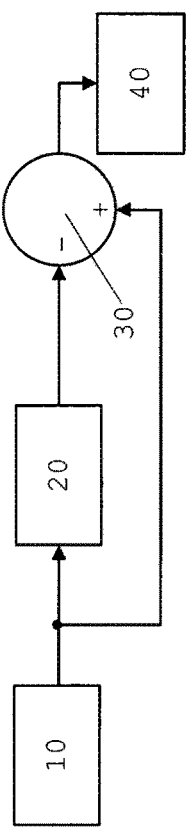
FIG. 7 a process chart which illustrates an embodiment example of a method according to the invention for the suppression of a mirror image.

As can be seen in particular from FIG. 2, the camera 3 can be arranged in an interior 6 of the vehicle 1, particularly in an area behind a windshield 7 of the vehicle 1. An image sequence of the external surroundings 8 of the vehicle 1 can be recorded through the windshield 7 by means of the camera 3 in a method step 10 (see FIG. 7). The image sequence comprises multiple external recordings (FIG. 4), and the external recordings are made temporally consecutively. A possible detection region of the camera 3 is shown by dashed lines in FIG. 2.

While the external recordings are being made by means of the camera 3, it may happen that an interfering and, hence, unwanted mirror image 10 occurs on an inner side 9 of the windshield 7. In the depicted embodiment example, the mirror image 10 occurs as a result of a reflection of an object 11 on the inner side 9 of the windshield 7, wherein this object 11 is located on a dashboard 12 which is arranged in the interior 6 of the vehicle 1. For example, the object 11 may be a (particularly bright) magazine, a receptacle or the like. Further, the mirror image 10 can also occur through a reflection of the dashboard 12 on the inner side 9 of the windshield 7 by itself without any object 11 being located on the dashboard 12.

Figure 4:
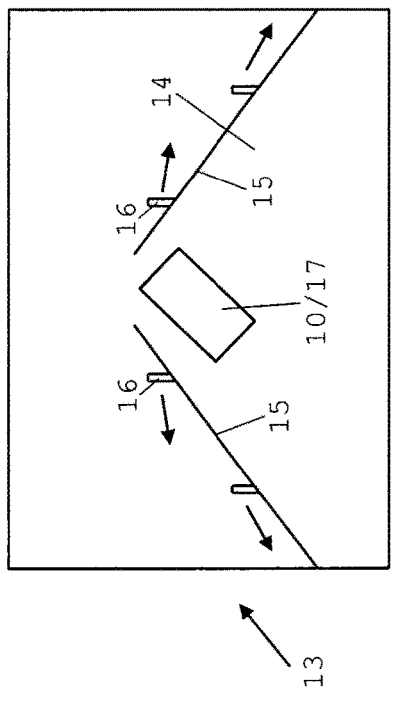
FIG. 4 a recording of an image sequence which was made by a camera of the camera system according to FIG. 1.

The interfering mirror image 10 is static in the external recordings, whereas a useful image images a moving scene while the vehicle 1 is driving. "Useful image" can mean an image area of the external recording 13 that does not contain the interfering mirror image 10. Referring to FIG. 4, the external recording 13 shows the mirror image 10 occurring due to a reflection of the object 11 on the inner side 9 of the windshield 7 (FIG. 2).

The mirror image 10 is static in the external recording 13 depicted in FIG. 4 and also in other external recordings (not shown) of the image sequence. Further, the external recording 13 depicted in FIG. 4 shows a road 14 on which the vehicle 1 moves forward, and an area ahead of the vehicle 1 is recorded by means of the camera 3 in the individual external recordings 13. Road marker posts 16 which move toward the vehicle 1 when the vehicle 1 moves forward are located at side edges 15 of the road 14, which is illustrated in FIG. 4 by arrows which, however, are not found in the external recordings 13.

In a method step 20, the interfering mirror image 10 can be detected as a static object within the external recordings 13 by means of the image evaluating unit 4 of the camera 3. The image evaluating unit 4 detects corresponding image components 17 in the external recordings 13 as static image components 17. The detection of static image components 17 in the external recordings 13 can be carried out, for example, by time averaging, by determining an optical flow within external recordings 13 and/or based on previously known structures (e.g., the dashboard 12 or the object 11) which are stored in an image file which can be accessed by the image evaluating unit 4 of the camera 3. In a subsequent method step 30, the detected static image components 17 in the external recordings 13 can be removed subtractively by means of the image evaluating unit 4 (see FIG. 7 and the first modified external recording 13' in FIG. 5), which can be carried out by means of the image evaluating unit 4 by image processing methods. The subtractive removal results in a second modified external recording 13" (FIG. 6) which can be displayed, for example, in a further process step 40 on a display device (not shown) inside the interior 6 of the vehicle 1. The second modified external recording 13" no longer contains the interfering mirror image 10.

FIG. 3 shows an alternative configuration of an embodiment example of a camera system 2' according to the invention which can be used, for example, in the vehicle 1 according to FIG. 1. According to FIG. 3, the camera system 2' comprises a first camera 3.1 with a first image evaluating unit 4.1, a second camera 3.2 and a processor unit 5. The second camera 3.2 can comprise a second image evaluating unit 4.2. In the depicted embodiment example, the processor unit 5 is arranged in the first camera 3.1. Alternatively, the processor unit 5 can also be arranged outside of the first camera 3.1, e.g., inside the second camera 3.2.

Figure 8:
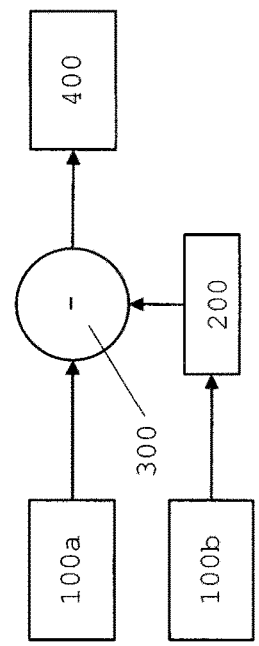
FIG. 8 a further process chart which illustrates a further embodiment example of a method according to the invention for the suppression of a mirror image.

The first camera 3.1 can be arranged in the interior 6 of the vehicle 1, particularly in the area behind the windshield 7 of the vehicle 1. In a method step 100a (see FIG. 8), an image sequence of the external surroundings 8 of the vehicle 1 can be recorded through the windshield 7 by means of the first camera 3.1. The image sequence comprises multiple external recordings (FIG. 4), and the external recordings are made temporally consecutively. A possible detection region of the first camera 3.1 is shown in FIG. 3 by dashed lines. As was described in connection with the embodiment example referring to FIG. 2, an interfering mirror image 10 can occur on the inner side 9 of the windshield 7 while the external recordings 13 are being made.

In order to remove the interfering mirror image 10 from external recordings 13, an image sequence having multiple internal recordings (not shown) can be recorded by means of the second camera 3.2 in a method step 100b. The internal recordings include an imaging of the dashboard 12 arranged in the interior 6 of the vehicle 1. Any object 11 located on the dashboard 12 will also be detected by the second camera 3.2. The second camera 3.2 is correspondingly arranged inside the interior 6 of the vehicle 1 in order to detect the dashboard 12 or an object 11 located on the dashboard 12. A possible detection region of the second camera is shown by dashed lines in FIG. 3. Method steps 100a and 100b can be carried out simultaneously in particular.

Figure 6:
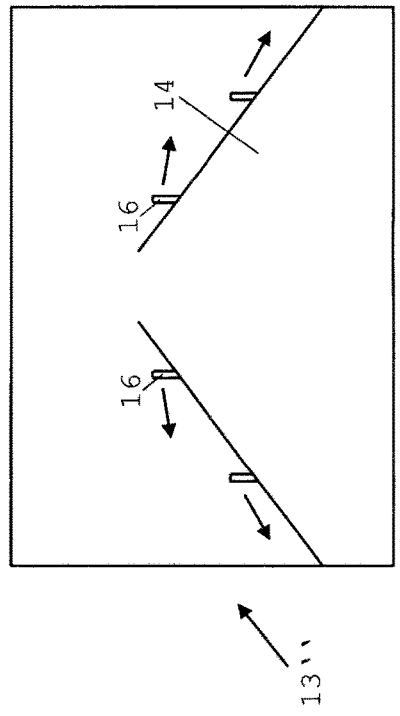
FIG. 6 the recording according to FIG. 4, in which only moving image components of the recording shown in FIG. 4 are shown.

In a further method step 200, the internal recordings of the second camera 3.2 can be matched to the external recordings of the first camera 3.1 by means of the processor unit 5. In a further method step 300, image components can be extracted from the external recordings 13 by means of the first image evaluating unit 4.1 of the first camera 3.1 and/or by means of the second image evaluating unit 4.2 of the second camera 3.2 so as to result in a modified external recording 13" as is shown by FIG. 6. In particular, those image components that result from a reflection of the dashboard 12 or which result from the objects 11 located on the dashboard can be extracted (see the modified external recordings 13' in FIG. 5). Further, the modified external recordings 13" according to FIG. 6 can be displayed on a display device (not shown) inside the interior 6 of the vehicle 1 in a further method step 400.

The invention claimed is:

1. A camera system for a vehicle, the camera system comprising a camera and an image evaluating unit, wherein:
the camera is arranged in an interior of the vehicle behind a windowpane of the vehicle, and is configured to record an image sequence, wherein the image sequence comprises a sequence of recorded images that each respectively include an external image of external surroundings of the vehicle through the windowpane and a static interior image component representing a reflection of an interior area of the vehicle reflected from the windowpane;
the image evaluating unit is configured to detect the static interior image components in the recorded images by at least one of: performing a time averaging of the recorded images of the image sequence, or determining an optical flow within the recorded images of the image sequence, or accessing and referring to reference images of previously known structures of the interior area wherein the reference images are stored in an image file; and
the image evaluating unit is configured to extract the static interior image components from the recorded images.

2. The camera system according to claim 1, wherein the image evaluating unit is configured to detect the static interior image components in the recorded images by performing the time averaging of the recorded images of the image sequence.

3. The camera system according to claim 1, wherein the image evaluating unit is configured to detect the static interior image components in the recorded images by determining the optical flow within the recorded images of the image sequence.

4. The camera system according to claim 1, wherein the image evaluating unit is configured to detect the static interior image components in the recorded images by accessing and referring to the reference images of previously known structures of the interior area.

5. The camera system according to claim 1, wherein:
said camera is a first camera,
the camera system further comprises a second camera that is arranged in the interior of the vehicle and is configured to record a sequence of internal images of the interior area,
the camera system further comprises a processor unit that is configured to match the internal images respectively to the recorded images, and
the image evaluating unit is configured to detect the static interior image components in the recorded images by reference to the internal images, and is configured to extract the static interior image components from the recorded images based on subtracting the internal images from the recorded images to which the internal images have respectively been matched.

6. The camera system according to claim 1, wherein the image evaluating unit is configured to produce a resultant series of useful images or modified images as a result of the extracting of the static interior image components from the recorded images.

7. The camera system according to claim 1, wherein the interior area comprises an area of a dashboard of the vehicle and/or at least one object disposed on the dashboard.

8. The camera system according to claim 1, wherein the image evaluating unit is configured to detect the static interior image components based on a feature that the static interior image components are constant and stationary among the recorded images of the image sequence, and the external images vary and exhibit relative motion among the recorded images when the vehicle drives.

9. The camera system according to claim 1, wherein the image evaluating unit is configured to extract the static interior image components from the recorded images by subtractive removal of the static interior image components from the recorded images to produce resultant useful images or resultant modified images.

10. The camera system according to claim 1, wherein the static interior image components are superimposed on the external images due to the reflection of the interior area from the windowpane to the camera.

11. The camera system according to claim 1, omitting and excluding any lens hood.

12. A camera system for a vehicle, the camera system comprising a first camera, an image evaluating unit, a second camera and a processor unit, wherein:

the first camera is arranged in an interior of the vehicle behind a windowpane of the vehicle, and is configured to record an image sequence, wherein the image sequence comprises a sequence of recorded images that each respectively include an external image of external surroundings of the vehicle through the windowpane and a static interior image component representing a reflection of a dashboard area in the interior of the vehicle reflected from the windowpane;

the second camera is arranged in the interior of the vehicle, and is configured and arranged to directly capture the dashboard area so as to directly record a sequence of internal images of the dashboard area;

the processor unit is configured to match the internal images respectively to the recorded images; and the image evaluating unit is configured to extract the static interior image components from the recorded images based on subtracting the internal images from the recorded images to which the internal images have respectively been matched.

13. The camera system according to claim 12, wherein the image evaluating unit and the processor unit are coextensive with one another.

14. A method comprising the steps:

with a camera arranged behind a windowpane of a vehicle in an interior of the vehicle, recording an image sequence, wherein the image sequence comprises a sequence of recorded images that each respectively include an external image of external surroundings of the vehicle through the windowpane and a static interior image component representing a reflection of an interior area of the vehicle reflected from the windowpane;

with an image evaluating unit, detecting the static interior image components in the recorded images by at least one of: performing a time averaging of the recorded images by the image evaluating unit, or determining an optical flow within the recorded images by the image evaluating unit, or accessing and referring to reference images of previously known structures of the interior area wherein the reference images are stored in an image file; and with the image evaluating unit, extracting the static interior image components from the recorded images.

15. The method according to claim 14, wherein the detecting of the static interior image components comprises the performing of the time averaging of the recorded images by the image evaluating unit.

16. The method according to claim 14, wherein the detecting of the static interior image components comprises the determining of the optical flow within the recorded images by the image evaluating unit.

17. The method according to claim 14, wherein the detecting of the static interior image components comprises the accessing of and the referring to the reference images.

18. The method according to claim 17, further comprising determining the reference images of the previously known structures by machine learning processes.

19. A method comprising the steps:

with a first camera arranged behind a windowpane of a vehicle in an interior of the vehicle, recording an image sequence, wherein the image sequence comprises a sequence of recorded images that each respectively include an external image of external surroundings of the vehicle through the windowpane and a static interior image component representing a reflection of a dashboard area in the interior of the vehicle reflected from the windowpane;

with a second camera arranged in the interior of the vehicle, directly capturing the dashboard area and thereby directly recording a sequence of internal images of the dashboard area;

with a processor unit, matching the internal images respectively to the recorded images; and with an image evaluating unit, extracting the static interior image components from the recorded images based on subtracting the internal images from the recorded images to which the internal images have respectively been matched.

20. The method according to claim 14, wherein the extracting of the static interior image components from the recorded images produces a resultant series of useful images or modified images, and further comprising providing the resultant series of useful images or modified images as an input to an electronic device of the vehicle.

\* \* \* \* \*